July 6, 1954  V. L. BOWSER ET AL  2,682,824
SELF-PROPELLED SOD CUTTING MACHINE
Filed July 27, 1950  3 Sheets-Sheet 2

INVENTOR.
Edwin J. Dare,
Virgil L. Bowser,
BY Victor J. Evans & Co.
ATTORNEYS

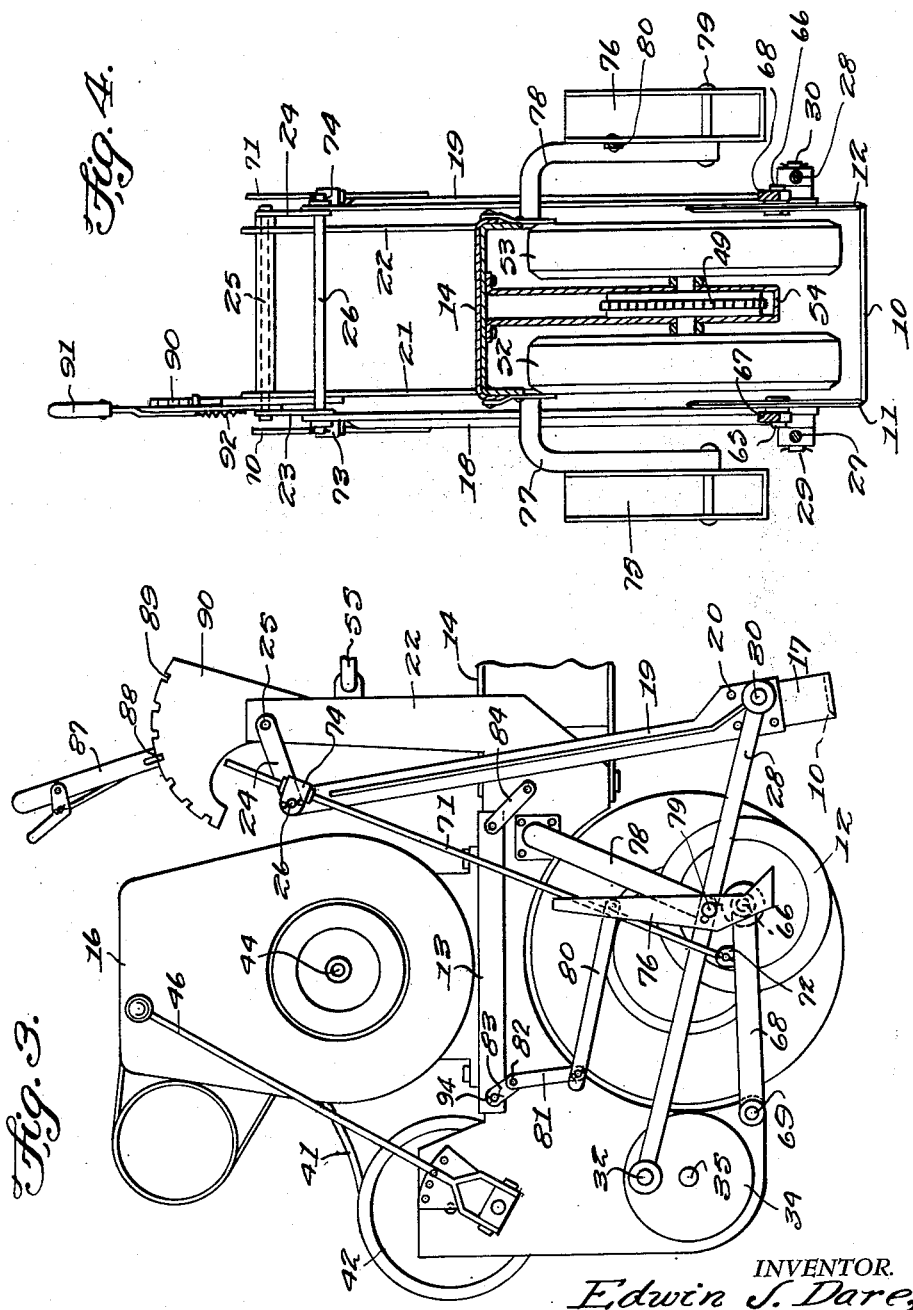

Patented July 6, 1954

2,682,824

UNITED STATES PATENT OFFICE 2,682,824

SELF-PROPELLED SOD CUTTING MACHINE

Virgil L. Bowser and Edwin J. Dare,
Cedar Rapids, Iowa

Application July 27, 1950, Serial No. 176,184

2 Claims. (Cl. 97—226)

This invention relates to machines for cutting sod where sod is removed and replanted to provide sod for lawns and other areas, and in particular this invention relates to a power actuated machine of the tractor type having a U-shape sod cutting blade with cutting discs aligned with the ends of the blade and with means for reciprocating the blade to facilitate cutting.

The purpose of this invention is to provide an improved method of actuating a sod cutting blade whereby the blade works in under the sod with a chopping or reciprocating action whereby a direct steady pull from the blade is eliminated.

In the usual type of sod cutting attachment a sod cutting blade positioned below the roots of the sod is drawn forwardly to peel or loosen the sod which may be rolled or stacked to facilitate being transported from one position to another. Where the blade is drawn forwardly with a steady continuous pull the sod is forced forwardly and due to the plowing action has a tendency to pile or mash together. With this thought in mind this invention contemplates a sod removing machine in which a blade is actuated with a reciprocating action similar to the chopping with a hoe whereby with the edges of the sod cut by rotating cutters the body of the sod is worked free from the soil.

The object of this invention is, therefore, to provide means for actuating a cutting blade of a sod removing machine with a chopping or reciprocating action.

Another object of the invention is to provide a sod removing machine having a reciprocating cutting blade in which means is provided for cutting the edges of the sod at the ends of the blade.

A further object of the invention is to provide a self propelled sod removing machine having a reciprocating blade with cutting discs for cutting sod at the ends of the blade which is of a simple and economical construction.

Other features and advantages of the invention will appear from the following description taken in connection with the drawings wherein:

Figure 3 is a side elevational view of the forward end of the machine, similar to that shown in Figure 1, except showing the cutting blade and discs in upwardly extended or inoperative positions.

Figure 4 is a front elevational view looking toward the forward end of the machine with parts omitted and with part of the bed of the machine broken away and shown in section.

Figure 1:
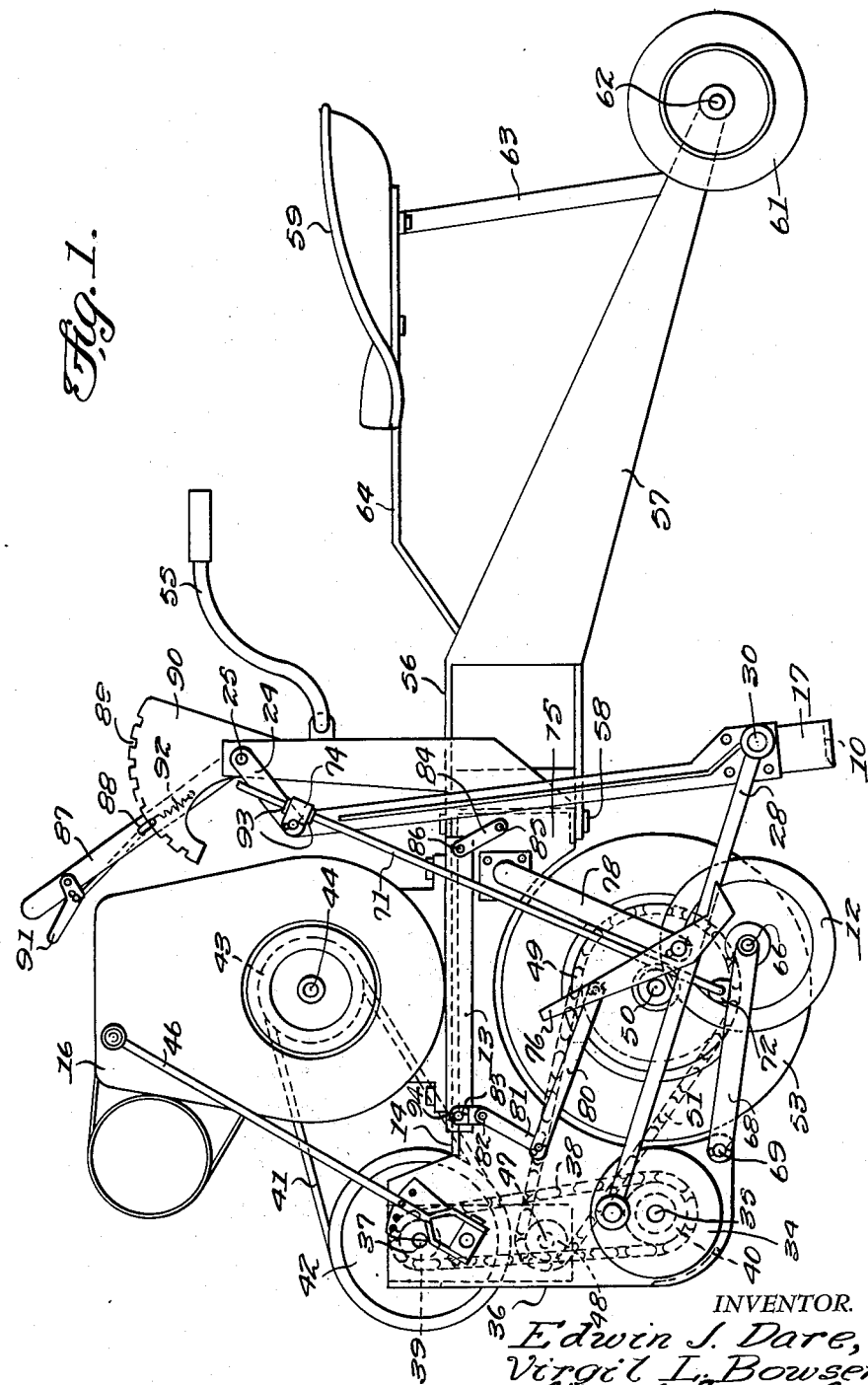
Figure 1 is a side elevational view of the sod cutting machine illustrating a cutting blade and discs extended downwardly in sod cutting positions.
Figure 2:
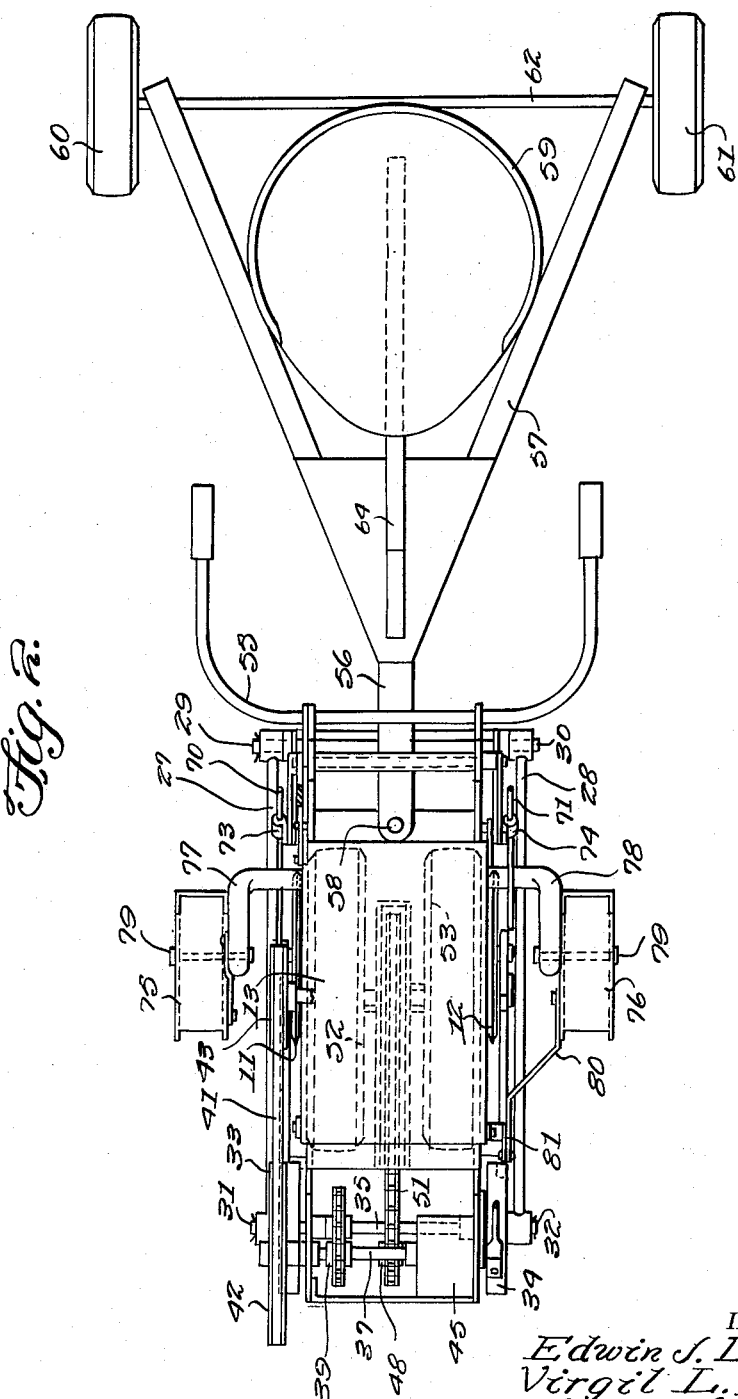
Figure 2 is a plan view of the sod cutting machine.

Referring now to the drawings wherein like reference characters denote corresponding parts the improved sod cutting machine of this invention includes a blade 10, discs 11 and 12 positioned to correspond with the ends of the blade, and a sliding plate or platform 13 mounted on the bed 14 of the frame 15 on which plate a motor 16 is carried.

The cutting blade 10 is in the form of a U having upwardly extended ends 17 by which it is attached to the lower ends of vertically disposed arms 18 and 19 by rivets or bolts 20. The arms 18 and 19 are pivotally connected to the upper ends of upwardly extended sections 21 and 22 of the frame by links 23 and 24 on the ends of a pin 25 extended through the uprights and connected to the arms 18 and 19 by a rod 26.

The lower ends of the arms 18 and 19 are connected to connecting rods 27 and 28 by pins 29 and 30 and the opposite ends of the connecting rods are connected to pins 31 and 32 that are eccentrically positioned on eccentrics 33 and 34. The eccentrics are mounted on a shaft 35 that is journalled in the forward end 36 of the frame 15.

The shaft 35 is driven from the engine or motor 16 through a countershaft 37 with a chain 38 trained over sprockets 39 and 40 on the shafts 37 and 35, respectively, and through a belt 41 on a pulley 42 on the shaft 37 and a pulley 43 on the motor shaft 44. The shaft 37 extends from a transmission housing 45 and the lever 46 is provided for shifting the transmission to different speeds and also to forward and reverse. The housing 45 is also provided with a shaft 47 and a sprocket 48 and this shaft drives a sprocket 49 on the steering wheel shaft 50 through a chain 51. Wheels 52 and 53 are mounted on the shaft 50 and with the axle 50 journaled in the centrally disposed element 54, as shown in Figure 4 the device is steered by the handle bars 55 which are mounted on the upwardly extended sections 21 and 22 of the frame.

The forward part of the frame is pivotally connected to a tongue 56 of a triangular shaped rear portion 57 by a king pin 58 and the section 57 which is provided with a seat 59 is mounted on wheels 60 and 61 through an axle 62. The seat is carried by a strut 63 with a support bar 64 extended from the forward end.

The side cutting discs or edgers 11 and 12 are freely rotatable on shafts 65 and 66 in the ends of links 67 and 68 and the links are pivotally attached to the rear section of the forward end 36 of the frame 15 by pins 69. The positions of the cutting discs 11 and 12 are independently adjustable by rods 70 and 71 that are pivotally connected to the links by sockets 72 and that extend through bearings 73 and 74 on the upper ends of the arms 18 and 19.

Treadles 75 and 76 are carried on the lower ends of arms 77 and 78, the treadle 75 being fixedly mounted so that it remains stationary and the treadle 76 being pivotally mounted on a pin 79, the upper end of the treadle 76 being connected by a link 80 to a lever 81 pivotally mounted on a pin 82 which is mounted on the frame 15 adjacent the lower edge of the plate 13. The upper end 83 of the lever 81 is pivoted at 94 on the plate 13, so that as the treadle 76 is pivoted anticlockwise the upper end 83 of the lever 81 slides the plate 13 upon which the motor 16 is mounted rearwardly thereby tightening the belt 41, providing a clutch for holding the parts in operative positions. The opposite end of the plate 13 is connected to the frame of the machine by a link 84 that is pivotally mounted on the frame by a pin 85 and connected to the plate by a pin 86.

The elevations of the edging discs 11 and 12 and blade 10 are controlled by hand lever 87 that is pivotally mounted on the shaft 25 on the outer end of which the arm 24 is positioned and the hand lever is held in adjusted positions by a latch 88 that is positioned to coact with notches 89 in a ratchet segment 90. The latch 88 is controlled by the lever 91 and a spring 92.

The rods 70 and 71 are retained in adjusted positions in the bearings 73 and 74 by adjusting nuts 93 and the bearings are pivotally mounted on the ends of the shaft 26 by which the arms 18 and 19 and links 23 and 24 are connected.

With the parts arranged in this manner the cutting discs 11 and 12 and the blade 10 may be set to suitable operative positions, as shown in Figure 1 and, with the engine running, the treadle 76 is pressed forwardly whereby the engine is moved to tighten the belt 41 and with the engine held in this position the machine is propelled by the wheels 52 and 53 with the eccentrics 33 and 34 actuating the blade 10 with a chopping action. By this means the sod is chopped free and with the edges cut by the discs 11 and 12 the sod is free to be rolled or stacked. The thickness of the sod being cut may readily be controlled by the position of the hand lever 87 and the machine may readily be steered by the handle bars 55.

It will be understood that modifications may be made in the design and arrangement of the parts without departing from the spirit of the invention.

What is claimed is:
1. In a sod cutting machine, the combination which comprises a frame having steering and driving wheels positioned under the forward end and spaced follower wheels journaled on the rear end, a motor mounted on the frame, a horizontally disposed cutter blade having upwardly extended ends, vertically disposed arms positioned on the sides of the frame on the lower ends of which the upwardly extended ends of the cutter blades are mounted, links pivotally and adjustably mounting the said arms on the frame, a hand lever and ratchet combination for vertically adjusting the said arms, eccentrics journaled in the forward end of the frame, links connecting the eccentrics with the lower ends of the blade carrying arms, spaced vertically disposed cutting discs journaled in the ends of links pivotally mounted on the frame, rods connecting the cutting discs to the vertically disposed arms, and means actuating the eccentrics and driving wheels by the motor.

2. In a sod cutting machine, the combination which comprises a wheeled frame, a motor mounted on the frame, a horizontally disposed cutter blade having upwardly extended ends, vertically disposed arms positioned on the sides of the frame on the lower ends of which the upwardly extended ends of the cutter blades are mounted, means pivotally and adjustably mounting the said arms on the frame, a hand lever and ratchet combination for vertically adjusting the said arms, eccentrics journaled in the forward end of the frame, links connecting the eccentrics with the lower ends of the blade carrying arms, spaced vertically disposed cuttings discs journaled in the ends of links pivotally mounted on the frame, rods connecting the cutting discs to the vertically disposed arms, means actuating the eccentrics by the motor, the said motor being mounted on a plate slidably mounted on the frame, a foot treadle positioned on the frame, and means sliding the plate on which the motor is mounted by the foot treadle to provide clutch means for bringing the parts into operative positions.

References Cited in the file of this patent
UNITED STATES PATENTS

| Number | Name | Date |
|---|---|---|
| 1,537,412 | Dafferner | May 12, 1925 |
| 2,260,344 | Shaw | Oct. 28, 1941 |
| 2,284,826 | Kroeger | June 2, 1942 |
| 2,286,312 | Scarlett et al. | June 16, 1942 |
| 2,345,425 | Phillips | Mar. 28, 1944 |
| 2,378,615 | Brown | June 19, 1945 |
| 2,614,477 | Habenicht | Oct. 21, 1952 |
| 2,617,347 | Provost | Nov. 11, 1952 |